UNITED STATES PATENT OFFICE.

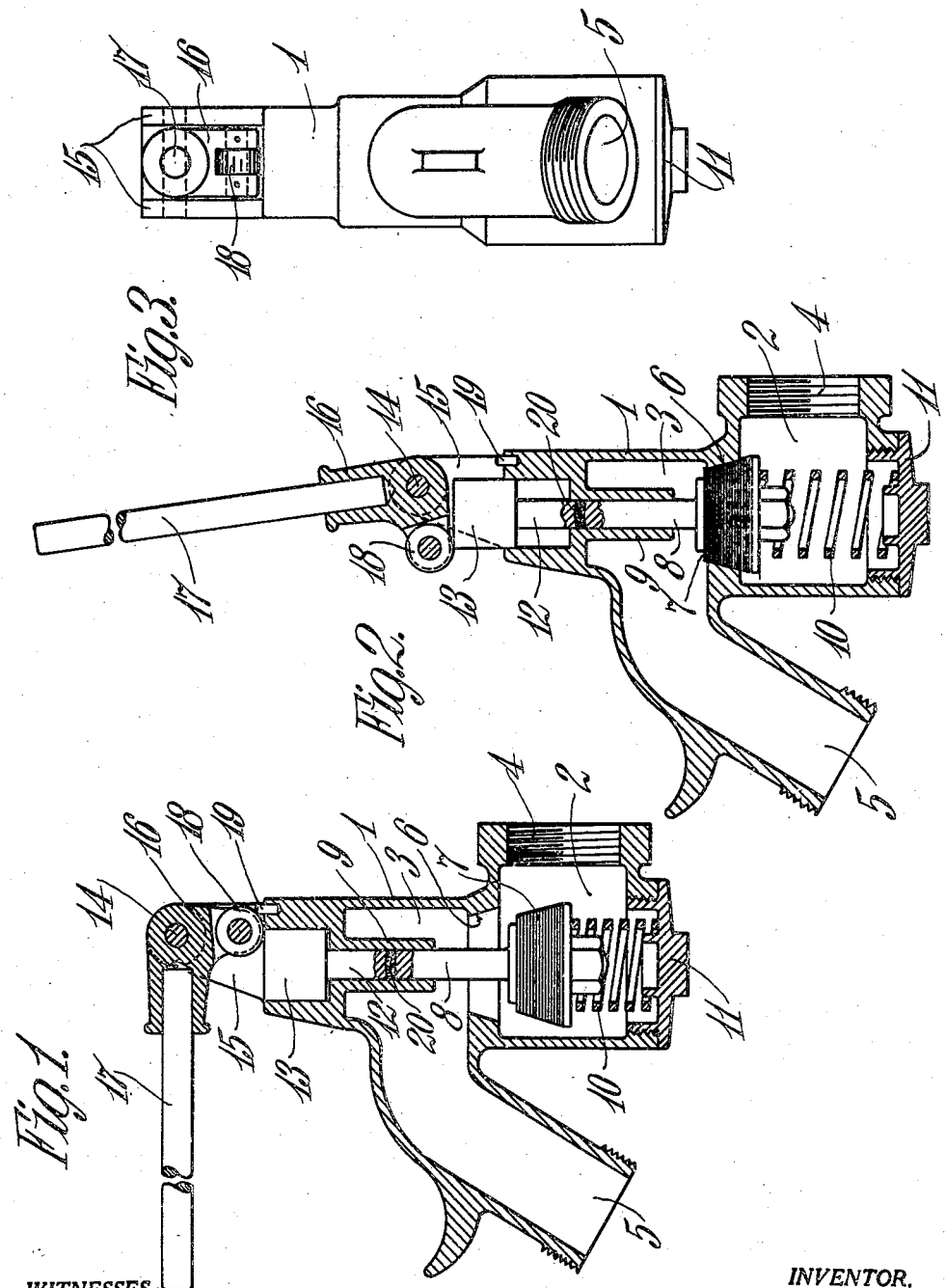
J. B. DAVIS.
VALVE CONSTRUCTION.
APPLICATION FILED OCT. 8, 1915.
1,200,435.
Patented Oct. 3, 1916.

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS.

VALVE CONSTRUCTION.

1,200,435.

Specification of Letters Patent.

Patented Oct. 3, 1916.

Application filed October 8, 1915. Serial No. 54,741.

*To all whom it may concern:*

Be it known that I, JOHN B. DAVIS, a citizen of the United States of America, and residing at Springfield, in the county of Hampden and State of Massachusetts, have invented certain new and useful Improvements in Valve Constructions, of which the following is a specification.

This invention relates generally to faucets and more particularly to improvements in valve construction therein. While the invention is capable of general application to faucets or valves, it is particularly suitable for use in the dispensing of oils, such as, gasolene and the like, and, as an example of one of its preferred adaptations, it is especially suitable for dispensing faucets for the tanks of oil wagons and in this connection may be properly termed a tank wagon valve.

Heretofore, globe valve faucets have commonly been employed for this purpose or other valve construction embodying a rotatable valve member which is turned into or upon its seat. Such valves cannot be quickly opened and closed but require a considerable interval for their operation. Moreover, where valves are continually opened and closed, as in those used with oil tank wagons, the rotary valve soon becomes worn and leaks. For example, any dirt or foreign substance lodging on the valve seat is ground into the latter by the turning of the valve onto the seat. Consequently, frequent grinding of the valve and seat is necessary to keep the valve in condition to prevent leakage. It has also been the practice heretofore to provide a stuffing box for the rotatable stem of the valve, and the packing in the box has been continuously subjected to pressure to force it against the valve stem. The packing under constant pressure soon loses its resilient engagement with the stem, and it is necessary to again compress the packing by turning the nut down upon the gland of the box. As a consequence, the packing soon loses its life and has to be replaced. This invention is concerned with improved structure to eliminate these faults as well as to secure additional advantageous results.

An object of this invention is to provide an improved valve construction, especially suitable for a faucet, wherein the valve member of resilient material is quickly movable to and from its seat in a straight line and is positively held to its seat by spring action aided by the pressure of the fluid, said valve and seat constructed and arranged to be comparatively unaffected by dirt lodging therebetween.

Another object of the invention is to provide in a valve for a faucet, an improved means for preventing leakage around the valve stem, said means embodying a packing member, which is subjected to pressure only during the relatively short intervals when the valve is open, whereby the said member can be used for a long period without attention or replacement, and which is characterized by extreme simplicity both in structure and operation.

Another object of the invention is to provide in a reciprocatory valve of the type described, improved actuating means therefor, which are characterized by ease, convenience, and rapidity of operation and by an arrangement of parts within the faucet, whereby a minimum obstruction is presented to the passage of fluid therethrough.

Another object is to provide in a valve of the class described, generally improved mechanical structure of extreme simplicity which is especially suitable for low cost of manufacture.

Other objects and advantages will appear in the description to follow and in the annexed claims.

Referring to the drawings as illustrating one preferred embodiment of the invention: Figure 1 is a sectional elevation of a faucet embodying the improvements; Fig. 2 is a similar view showing the parts in closed position; and Fig. 3 is a front elevational view of the faucet.

Referring to these drawings: 1 represents the casing of the faucet which is formed as shown with an inlet chamber 2 and an outlet chamber 3. The former chamber has a suitable tapped inlet opening 4 which is adapted to be threaded onto the outlet pipe of a tank or the like and the chamber 3 leads to a delivery outlet 5. Between the chambers 2 and 3 is formed a frusto conical valve seat 6 which is adapted to receive a mating valve element 7. The latter is of novel structure and has certain advantages due to flexible and resilient construction as will later appear. It is formed of a plurality of thin circular disks, preferably of leather, which are superposed one upon the other and clamped upon the stem 8 between a suitable flange thereon and a washer and nut in a manner obvious from the drawings. The stem 8 is slidably mounted in a boss 9 depending from the upper portion of the casing into the chamber 3, and it is to be noted particularly that the stem 8 and boss 9 are of small diameter relatively to the chamber 3 so that the obstruction presented by these members to the passage of liquid through the chambers is reduced to a minimum. The valve 7 is normally held to the seat 6, as shown in Fig. 2, by the action of a strong coiled spring 10 which is interposed between the valve and a removable cap 11 in the bottom of the casing 1.

In the upper portion of the boss 9 is a second stem 12 which is formed with an enlarged head 13, and this stem is adapted to open the valve 7 against the pressure of spring 10 by means to be described. Pivotally mounted on a pin 14 fixed in spaced ears 15 integral with the casing 1 is a bell-crank lever 16 which has a suitable actuating arm 17 removably mounted in one arm thereof. The other arm of this lever 16 is forked to receive a suitable roll 18 which is movable over the upper surface of the head 13 in an obvious manner to force the stems 12 and 8 downwardly to open the valve 7. A pin 19 is fixed in the upper part of the casing 1 adjacent the head 13 to act as a stop for the roll 18, and it is to be noted that, when the latter abuts the pin 19, as shown in Fig. 1, the line of action lies to the right of the center of pin 14 so that the roll is held in position "toggle fashion", whereby the valve 7 is kept open without effort on the part of the operator.

The stems 8 and 12 do not directly act on one another, but act through the medium of a circular packing disk 20 of suitable material, preferably resilient, as leather, which is loosely interposed between the stems. This packing is arranged to be compressed between the stems 8 and 12 when the valve is open, whereby the packing is expanded against the interior walls of the boss 9 to prevent leakage of the fluid therethrough. The adjacent ends of the stems 8 and 12 are preferably formed convex and concave, respectively, to assist in the action just described. It will be obvious that the use of this packing 20 is a simple and efficient means of preventing leakage as against the well-known stuffing box. It has, however, advantageous features not found in the stuffing box, which are due primarily to the fact that the packing 20 is normally not under pressure. It is subjected to pressure only when the valve 7 is open, and the time that the valve is open is relatively short in comparison with the time when it is closed. Thus, by arranging the packing to be compressed only when needed to prevent leakage, the life of the packing is greatly prolonged and the constant attention and frequent renewal of packing heretofore experienced with stuffing boxes is avoided by the use of this improvement.

In the manufacture of this valve, it is not necessary to accurately grind the valve 7 to its seat 6. Both these elements need no finish other than simple turning operations in a lathe. This elimination of the most expensive operation in the manufacture of valves is obtained by the use of the peculiar valve structure already described. The leather disks of the valve 7 are flexible and resilient to a sufficient extent so that the valve will conform to small inaccuracies in the seat. The strong spring 10 in automatically closing the valve is aided by the pressure of the liquid so that the element 7 is positively forced against and held to its seat 6. Any dirt on the seat does not materially affect the element 7 as the latter is resilient and is forced around the foreign substance to effect a tight closure. Obviously, if the element 7 turned in its seat, as in globe valves, damage to the valve or the seat or both would result by the grinding action, but, with the reciprocatory straight line movement of the valve, this trouble is eliminated.

The valve construction described possesses marked advantages in simplicity of construction and is thus capable of economical manufacture. The laborious and expensive grinding of the valve and its seat is eliminated and simple finish by turning in a lathe is all that is required. The stuffing box construction is entirely dispensed with, and the only work necessary to prevent leakage is to cut the circular packing 20 and concave and convex the stems 12 and 8, respectively. All the operations on the valve with the exception of a few thread cutting operations are accomplished by simple turning and boring. Thus, the improved structure is especially advantageous on the score of inexpensive manufacture, and it will be obvious that the assembly of the parts is also as simple as is the manufacture thereof.

Thus, an improved valve structure has been provided, particularly adapted for faucets, which is of improved and simplified mechanical structure. This structure is characterized by simple and efficient valve action arranged to require little attention and care for its maintenance in proper working order. In addition, improved means, characterized by long life and efficient action with a minimum of attention, have been provided to prevent leakage around the actuating stem. Finally, the valve is arranged for quick and convenient opening and positive automatic closing in a simple manner.

It is recognized that modifications may be made in the structure heretofore described for illustrative purposes without departing from the scope of the invention which is defined by the appended claims rather than by the foregoing description.

What I claim is—

1. The combination with a suitable casing of a valve arranged to be opened and automatically closed by straight line movements, a stem for the valve slidably mounted in the casing, a plunger slidably mounted in the casing in line with said stem, a packing between the adjacent ends of the plunger and stem and means to move said plunger, said packing arranged normally to lie loosely between the stem and the plunger and, when the valve is opened, to be compressed between the plunger and the stem and expanded against the walls of the casing to prevent leakage of the fluid past the stem.

2. A faucet, comprising, a suitable casing formed with inlet and outlet passages, a valve seat formed in said casing between said passages, a valve, a spring arranged to normally hold the valve to its seat, a stem for the valve, slidably mounted in the casing, a second stem slidably mounted in the casing, a packing element between said stems, and means without the casing operable to engage and move the second stem, whereby said packing is compressed between the stems to prevent leakage of fluid past the latter and said first-named stem is moved to open the valve against the spring.

3. A faucet, comprising, in combination, a suitable casing having inlet and outlet passages formed therein, a reciprocable valve arranged normally to close the communication between said passages, a spring to move and hold the valve to its seat, said valve arranged to be also held by fluid pressure, a stem for the valve slidably mounted in the casing, a plunger slidably mounted in the latter in line with the stem and arranged to move the same, a packing between said plunger and stem arranged to be expanded against the walls of the casing when the valve is open by compression between the plunger and stem, an enlarged head on the plunger, and a bell-crank-lever pivotally mounted without the casing having a part arranged to engage said head to move the plunger and open the valve, said lever arranged to be held automatically in one of its positions to keep said valve open, said valve arranged automatically to close when the lever is moved to release the plunger.

JOHN B. DAVIS.